United States Patent [19]

Barkats et al.

[11] 4,101,101

[45] Jul. 18, 1978

[54] SOLAR GENERATOR

[75] Inventors: Gérard Barkats, Mandelieu-la-Napoule; Claude Chenin, Cannes-la-Bocca; Jean Foucras, Mougins; Louis Marnay, Mouans Sartous, all of France

[73] Assignee: Societe Nationale Industrielle Aerospatiale, Paris, France

[21] Appl. No.: 791,932

[22] Filed: Apr. 28, 1977

[30] Foreign Application Priority Data

May 3, 1976 [FR] France .................... 76 13098

[51] Int. Cl.² .............................................. B64G 1/10
[52] U.S. Cl. ...................................... 244/173; 52/731; 136/89 P; 136/89 SA
[58] Field of Search .................... 136/89 SA, 89 P; 244/173; 52/455, 456, 613, 624, 629, 731

[56] References Cited

U.S. PATENT DOCUMENTS

| 3,350,234 | 10/1967 | Ule | 244/173 |
|---|---|---|---|
| 3,532,299 | 10/1970 | Williamson et al. | 244/173 |
| 3,715,600 | 2/1973 | Fletcher | 244/173 |
| 3,724,153 | 4/1973 | Wessells et al. | 52/731 |
| 3,995,080 | 11/1976 | Cogburn | 52/731 |

OTHER PUBLICATIONS

Hasbach, "Lightweight Solar Panel Devel.", NASA TR 32-1519, Mar. 15, 1971.
Corbett et al., "Lightweight Rigid Solar Array Struc. Consid.", Conf. Record, 11th IEEE Photospecialist Conf., 5-6-75.

Primary Examiner—Galen L. Barefoot
Attorney, Agent, or Firm—Merriam, Marshall & Bicknell

[57] ABSTRACT

The present invention relates to a solar generator for producing electrical energy from solar energy, mounted in particular on board an artificial satellite and constituted by a plurality of pivoted panels, stacked but unfoldable, each of which comprises a thick frame inside which is disposed a thin flexible support carrying solar cells, said frame comprising intermediate stiffeners connecting two opposite sides of the frame, wherein each panel comprises, between two intermediate stiffeners and between the end intermediate stiffeners and the sides of the frame there-opposite, a plurality of wide, flat auxiliary stiffeners, transverse with respect to the intermediate stiffeners and on which said flexible support is fixed at least partially.

14 Claims, 11 Drawing Figures

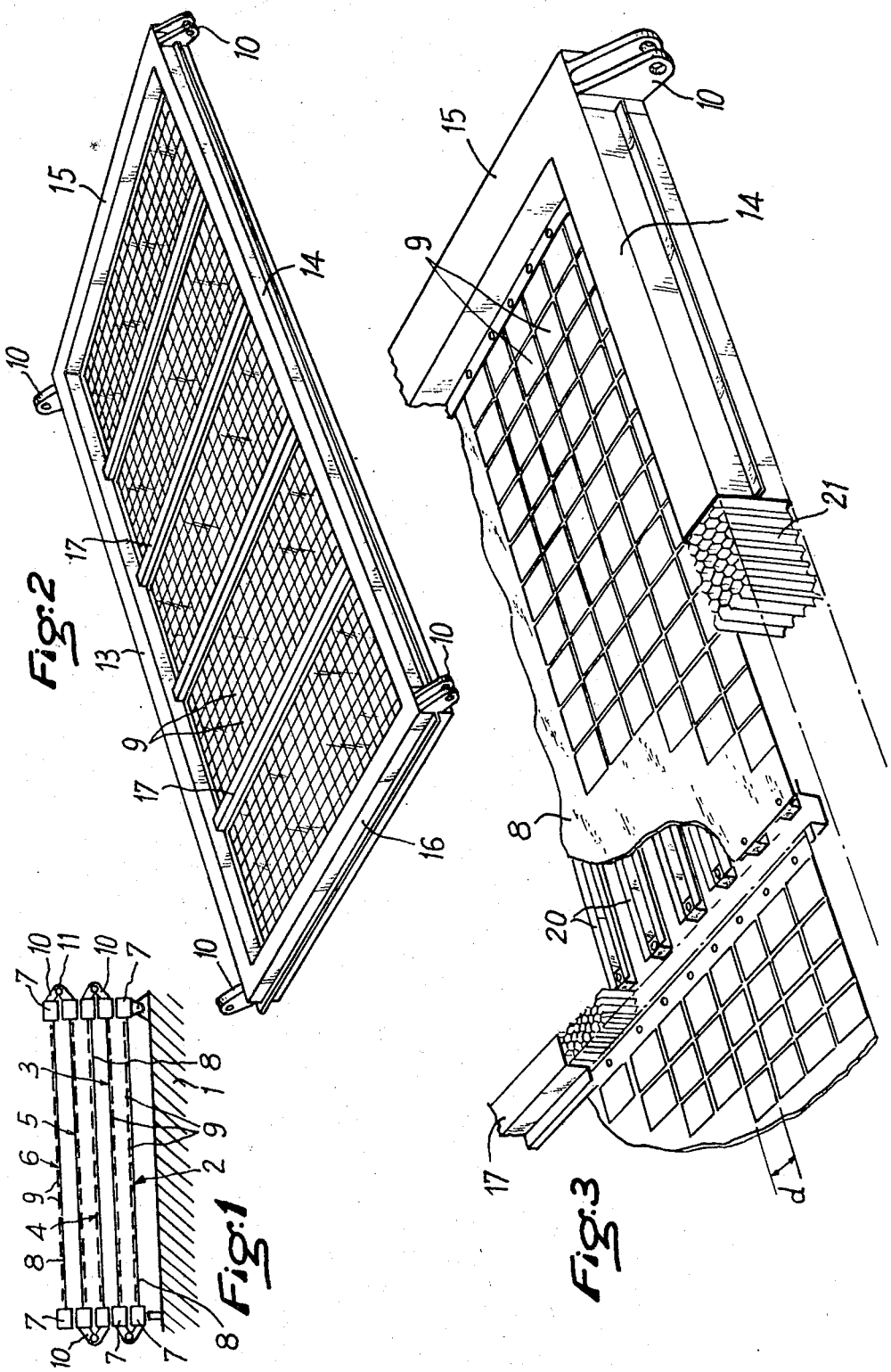

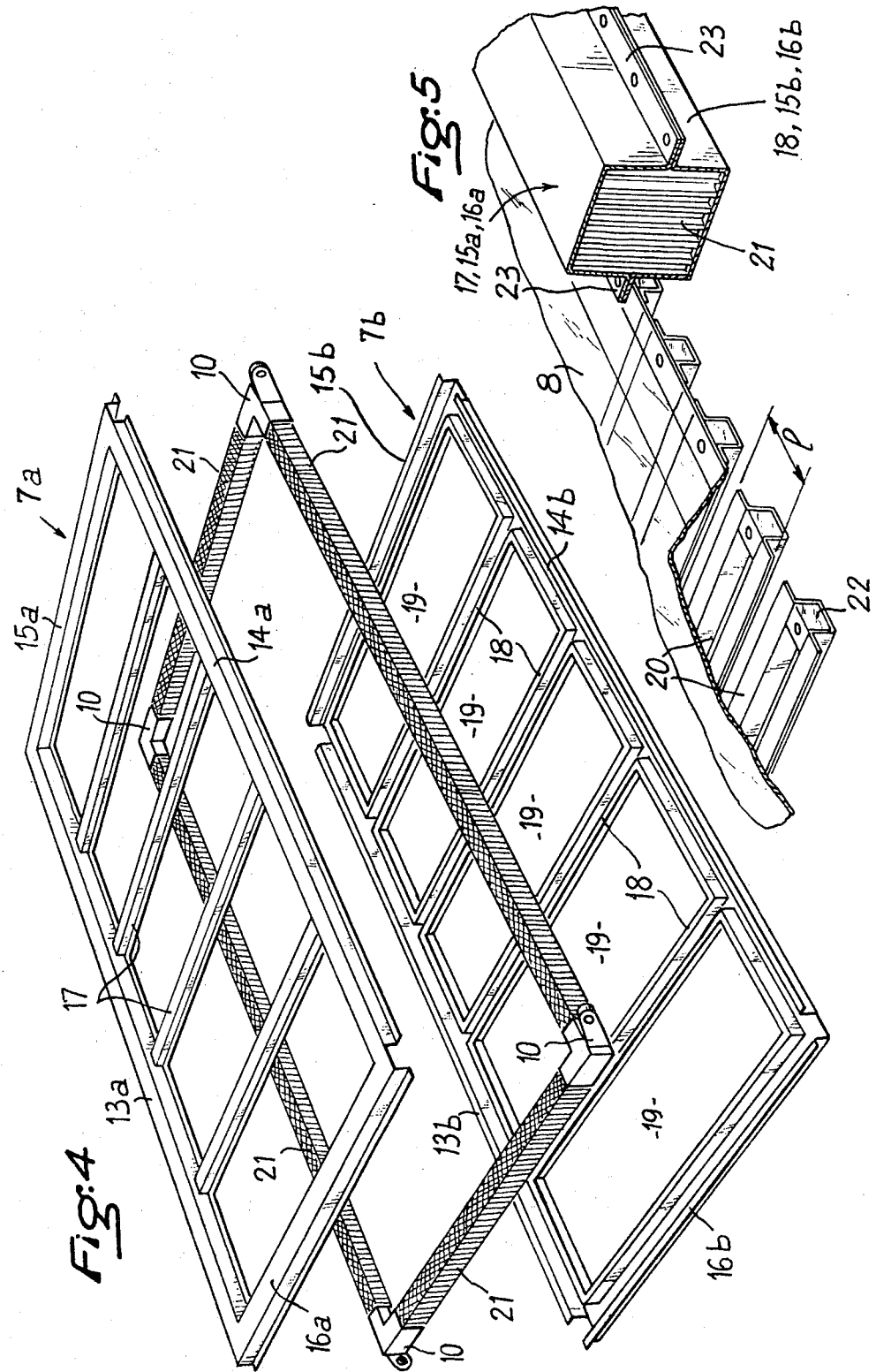

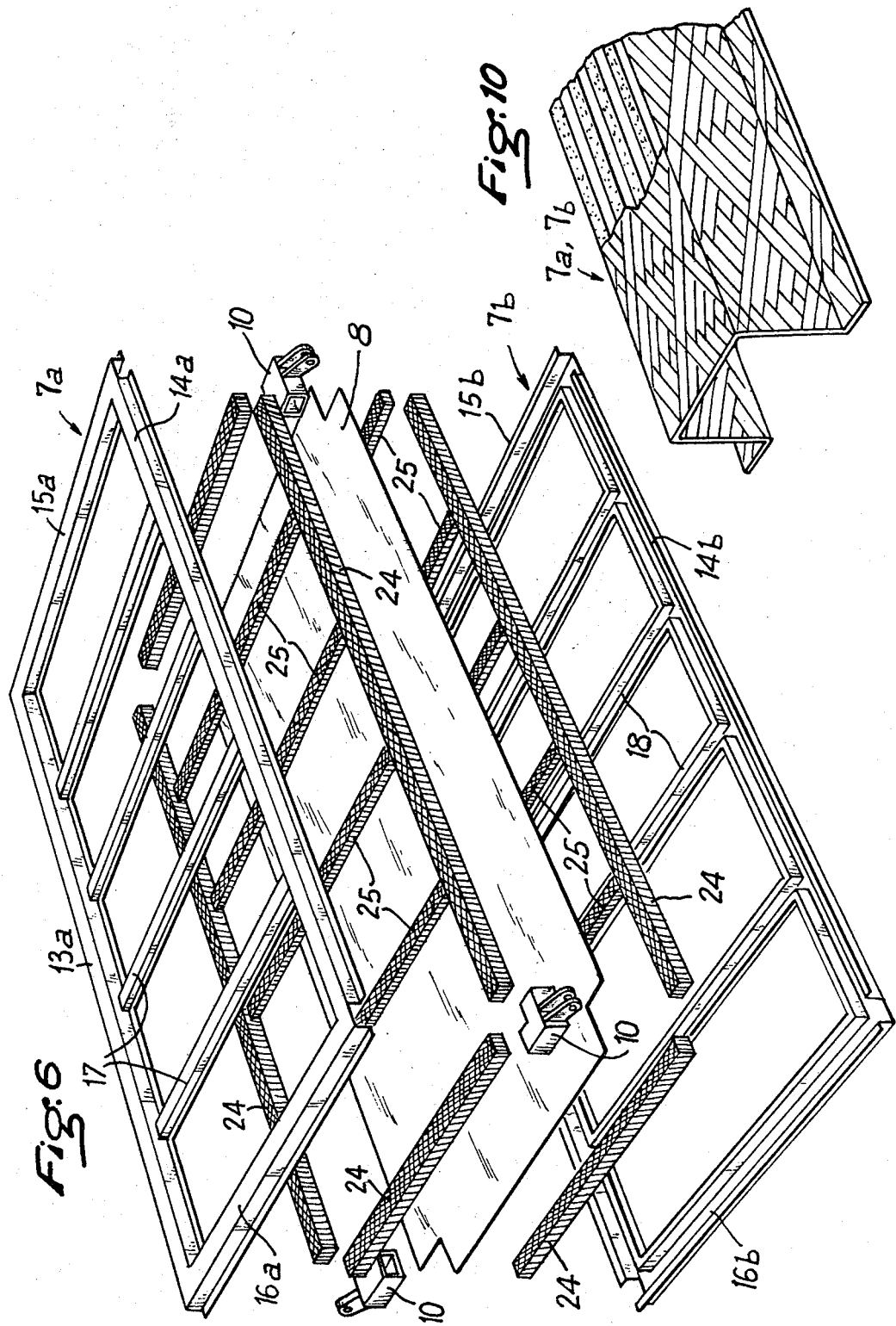

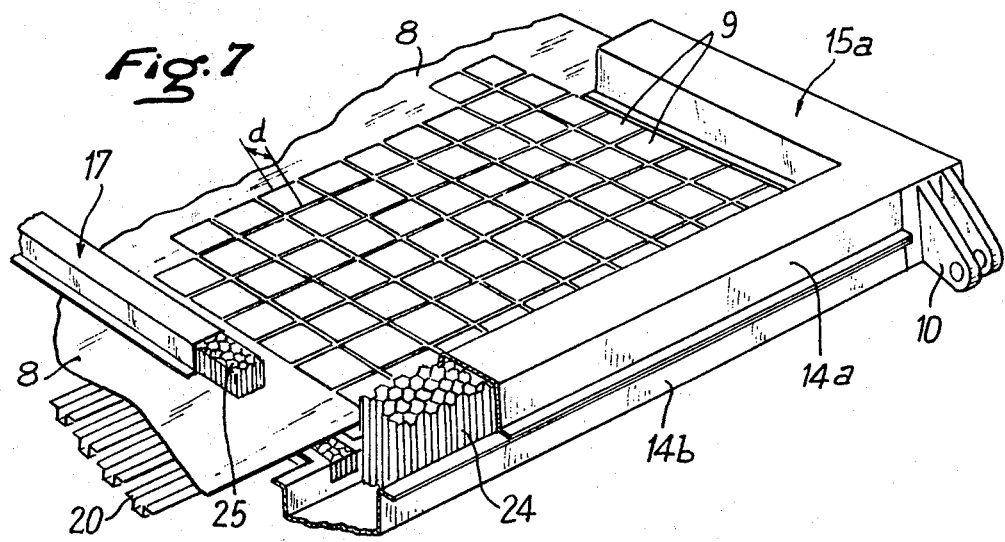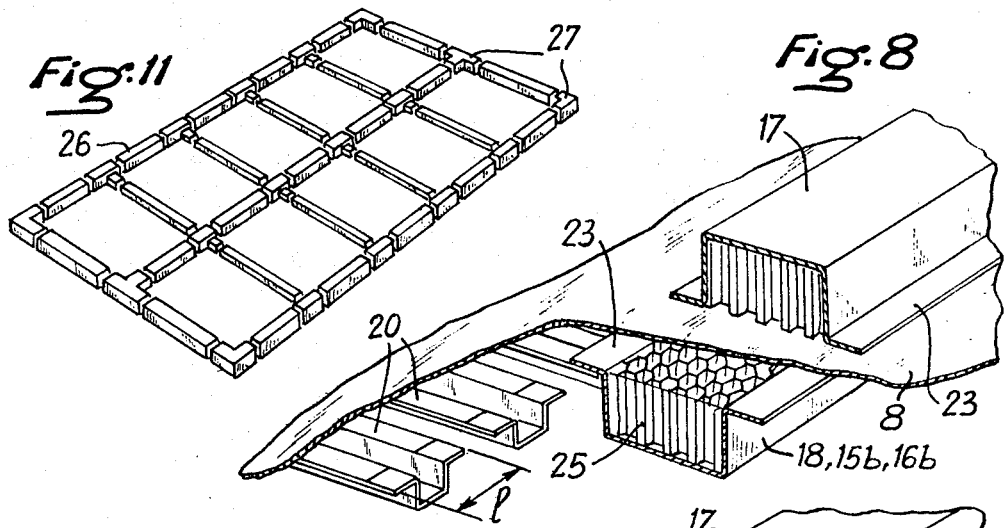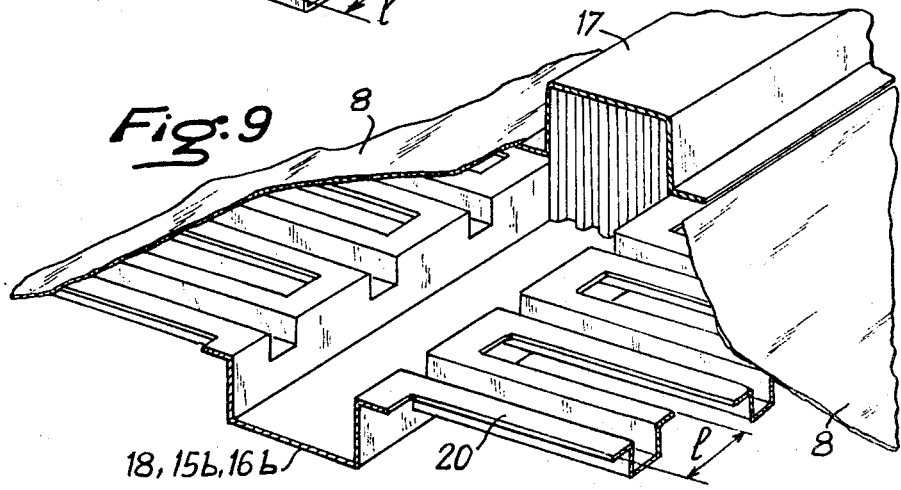

SOLAR GENERATOR

The present invention relates to a generator for producing electrical energy from solar energy, hereinafter referred to as a solar generator.

This generator, mounted on board an artificial satellite, is constituted by a plurality of pivoted panels, stacked but unfoldable, each of which comprises a thick frame inside which is disposed a thin, flexible support carrying solar cells, said frame comprising intermediate stiffeners connecting two opposite sides of the frame.

Solar generators of this type are already known, which comprise a plurality of panels adapted to occupy two relative positions. In the first of these positions, which corresponds for example to the launching of the satellite, the panels are superposed and rest on one another via their frame. In the second of said positions, the panels are unfolded and are at least approximately in line with one another.

To avoid the flexible supports of the solar cells of two consecutive panels, in folded position, banging against each other due to the vibrations to which said generator is subjected, the total displacement possible of a flexible support perpendicularly to the plane of its frame is provided to be shorter than the thickness of said frame.

To this end, two assemblies of the flexible support in its frame are already known. The first assembly consists in stretching the flexible support by means of springs between two end uprights of the frame and in providing, on either side of said support, a certain number of intermediate uprights, whose role is, on the one hand, to allow the flexible support to move freely parallel to its plane under the effect of the tension to which it is subjected, and, on the other hand, to prevent this support from moving, at the location of the intermediate uprights, perpendicularly to its plane, these intermediate uprights thus creating nodes of forced vibrations for the support.

In this way, the frame and the support being divided into compartments by the different uprights, the assembly is given a pseudo-rigidity which prevents the support of the solar cells from knocking against the structure of the body of the satellite or against the support of an adjacent frame, when it is subjected to considerable vibrations, particularly when said satellite is launched.

This support therefore acquires a resonance frequency proportional to the tension to which it is subjected and the displacement of the support in such a compartment, perpendicular to its plane, is as little as the resonance frequency is high.

However, such a mode of fixing the support of the solar cells presents numerous drawbacks. In fact, the solar cells are assembled in interconnected modules on the flexible support; then said latter is fixed to its frame and stretched. The tension established is relatively high and causes elongations of the flexible support. These elongations are distributed in the intercellular spaces where seriesparallel conductors for interconnecting said cells are located. Now, by design, these interconnection conductors are provided with an expansion loop so as to be able to absorb the differential thermal expansions when the satellite is on orbit and avoid considerable stresses being induced at the weld spots between the solar cells and the conductors. Due to the tension exerted on the flexible support during its assembly on the frame, the elongation of the support which results therefrom considerably absorbs the expansion loops provided for the conductors. In this way, said loops can no longer completely fulfill the role for which they are provided. Moreover on orbit and in phase of eclipse, the frame and the flexible support expand and contract differently. The springs for assembly of the flexible support on its frame must therefore be able to absorb considerable variations in length without introducing too great a stress on the flexible support. Furthermore, for the resonance frequency of the flexible support to be substantially the same in each compartment of the frame, or in any case for it not to drop below a minimum value corresponding to a value determined by the thickness of the frame and the vibrations to which the generator is subjected, it is indispensable that the tension can be distributed uniformly in each compartment, from one set of springs to the opposite set. To this end, the intermediate uprights must leave the support free, parallel to its plane. Experience shows that these uprights are, however, not infinitely rigid and that they themselves start to vibrate. The two elements of the same upright can touch each other, thus gripping the flexible support and preventing it from moving parallel to the direction of its tension. Consequently, the frequency in the central compartments is increased with respect to the nominal value whilst the frequency in the end compartments directly connected to the springs reduces with respect to the nominal value whilst the frequency in the end compartments directly connected to the springs reduces with respect to the nominal value. In consequence, the amplitudes of the displacements of the flexible support perpendicularly to its plane (which vary inversely proportionally to the square of the frequency) increase in the end compartments and, at these locations, the flexible support of a frame may bump against the flexible support of the adjacent frames or against the structure of the body of the satellite. In this way, such a flexible support assembly in the frame by means of end springs, causes:

- a strict dependence between the frequency desired for the flexible support and the geometry of the interconnection loop conductors;
- a strict dependence between the frequency desired for the flexible support and the structural dimensions of the frame;
- a considerable difficulty in maintaining, in each compartment, the frequences of the flexible support within the limits centered around the desired nominal value or, in any case, above a minimum value (in order to effect a decoupling of resonance frequency between the solar panel and the body of the satellite).

The second known mode of assembling a flexible support in its frame consists in providing, inside the frame, a trellis structure stretched in the manner of the strings of a tennis racquet. The flexible substrate, itself carrying the solar cells, is then adhered to the stretched trellis. The advantage of this second mode of assembly over the first lies in the fact that it eliminates the permanent tension in the supple support and therefore the elongations of the conductors interconnecting the cells. Moreover, in this case, each skin compartment delimited in the frame by transverse stiffeners, presents a resonance frequency which is substantially identical to the desired nominal value. On the other hand, the drawback of this second mode of assembly lies in that any dynamic deformation in flexion of the uprights of the frame induces considerable variations in tension in the stretched trellis and therefore in the flexible support, these variations in tension being able to occur during very short intervals of time. A phenomenon of banging therefore often appears which deteriorates the network of the solar cells.

It is an object of the present invention to remedy the drawbacks of the known panels for solar generators. The invention enables panels to be obtained in which the flexible support is not subjected to any tension, whilst presenting the necessary rigidity for avoiding too considerable displacements transversely to its plane.

To this end, the present invention relates to a generator for producing electrical energy from solar energy, mounted on board an artificial satellite and constituted by a plurality of pivoted panels, stacked but unfoldable, each of which comprises a thick frame inside which is disposed a thin flexible support carrying solar cells, said frame comprising intermediate stiffeners connecting two opposite sides of the frame, wherein each panel comprises, between two intermediate stiffeners and between the end intermediate stiffeners and the sides of the frame there-opposite, a plurality of wide, flat, auxiliary stiffeners, transverse with respect to the intermediate stiffeners and on which said flexible support is fixed at least partially.

In this way, due to the rigidity of said auxiliary stiffeners and to their support on the sides of the frame and/or on the intermediate stiffeners, the displacements of the flexible support, perpendicularly to its plane, are considerably hindered.

Said solar cells being disposed in lines and columns on the flexible support, the auxiliary stiffeners are preferably of width substantially equal to that of a row of said cells. The cells of each row may then rest flat, via the flexible support, either on one auxiliary stiffener, or astride two adjacent stiffeners.

Each auxiliary stiffener is advantageously formed by a section in the form of a rectangular omega and the flexible support is fixed, for example by adhesion, on the opposite flat flanges of said section. In this case, it is also advantageous if the sides of the thick frame and the intermediate stiffeners are themselves each constituted by two sections of rectangular omega cross-section, the cavities of which are opposite and which are assembled by their flanges. In this way, the ends of the auxiliary stiffeners may be fixed on said flanges for assembling the sides of the frame or the intermediate stiffeners.

In an advantageous embodiment of the invention, the frame is formed of two superposable shells, each being made in one piece and comprising sides and intermediate stiffeners having a rectangular omega cross-section. Such shells may be obtained by moulding a structure of resistant fibres, for example of carbon or boron, coated with synthetic resin. These two shells may be identical and assembled by adhesion. To increase the rigidity of the assembly, a reinforcement, for example a honeycomb arrangement, may preferably be provided inside the sides of the frame and/or the intermediate stiffeners.

The auxiliary stiffeners may be either securely connected to one of the shells or may be integral with one of said shells at the moment of manufacture thereof. In both cases, they may present the same composite structure as the sides and intermediate stiffeners.

The flexible support of the solar cells may either be in one piece for all the frame, or be composed of a plurality of parts, each of which covers a frame compartment, defined by two adjacent intermediate stiffeners or by a side of the frame and the end intermediate stiffener opposite.

The invention will be more readily understood on reading the following description, with reference to the accompanying drawings, in which:

FIG. 1 is a schematic representation of a solar generator of the type to which the present invention relates.

FIG. 2 shows a perspective view of a panel, according to the invention, for the generator of FIG. 1.

FIG. 3 is an enlarged perspective view, with parts torn away, of part of the panel of FIG. 2.

FIG. 4 is an exploded view in perspective showing the structure of the frame of the panel of FIG. 2.

FIG. 5 is an enlarged perspective view illustrating the fixing of the auxiliary stiffeners on the uprights and intermediate transverse stiffeners of the frame of the panel of FIG. 2.

FIG. 6 illustrates a variant embodiment of the structure of the panel of FIG. 2.

FIG. 7 illustrates in perspective, with parts torn away, part of the panel obtained according to FIG. 6.

FIG. 8 illustrates a detail of the panel of FIGS. 6 and 7.

FIG. 9 illustrates, in perspective, a detail of a variant embodiment of a panel for a solar generator according to the invention.

FIG. 10 shows, in perspective, an embodiment of the sections used in the manufacture of the panels illustrated in FIGS. 2 to 9.

FIG. 11 gives a variant embodiment of a frame, according to the invention, for the solar generator of FIG. 1.

In these Figures, identical references designate like elements.

Referring now to the drawings, the solar generator shown schematically in FIG. 1, is intended to be mounted on a satellite, of which only a portion 1 of the outside wall has been shown. This solar generator comprises a plurality of identical panels 2,3,4,5 and 6, each provided with a thick peripheral frame 7. Inside this frame 7 is disposed an insulating flexible support 8, for example made of synthetic material bearing the registered Trade Mark KAPTON. This flexible support 8 is disposed substantially in the median plane of the thick frame 7 and on one of its faces it carries solar cells 9. The panel 2 is fixed to the wall 1 of the satellite, the panel 3 is pivotally mounted on panel 2, panel 4 on panel 3, and so on, the pivots being located alternately on one side and the other of the panels. These panels are pivoted via complementary pivot fittings 10 carried by the frames and through which pins 11 pass.

When the solar generator is not in use, the panels 2 to 6 are folded on one another, in the manner shown in FIG. 1, their frames 7 being superposed and in contact with one another. On the other hand, when it is desired to use the generator of FIG. 1, the panels 2 to 6 are unfolded by pivoting them about pivots in order to direct the solar cells 9 towards the sun.

It is readily appreciated that in folded position (cf. FIG. 1), when the generator is subjected to considerable vibrations (for example at the moment of launching of the satellite 1), it is important that the possible movement of the supports 8 perpendicularly to their plane be shorter than the thickness of the frames 7, in order to avoid any banging against adjacent supports 8.

As has been explained hereinabove, in the prior art, this was attempted by subjecting the supports 8 to strong tensions in their plane, with the drawbacks mentioned.

FIGS. 2 to 11 illustrate embodiments of solar panels according to the invention in which the supports 8 are prevented from banging one another, without being subjected to considerable tensions in their plane.

FIG. 2 shows a plan view in perspective of a panel 5 (which may be any one of panels 2 to 6 of FIG. 1), of rectangular form.

The frame 7 of this panel 2 has two longitudinal sides 13 and 14 on which are fixed the pivot fittings 10, and two transverse sides 15 and 16. These sides 13,14,15 and 16 are thick and, inside this frame, approximately in the median plane of the frame, there is disposed a flexible support 8 made of KAPTON, on one face of which are arranged interconnected solar cells 9. This frame comprises, moreover, stiffeners 17 and 18 (cf. FIG. 4) parallel to sides 15 and 16 of the frame and securely connected at their ends to sides 13 and 14 respectively. The stiffeners 17 are disposed on the side of the face of the support 8 carrying the cells 9, whilst the stiffeners 18 are disposed on the opposite side of said support 8. The stiffeners 17 and 18 are disposed opposite each other in two's.

FIG. 4 shows an advantageous embodiment of the frame 7 of the panel of FIG. 2 an its stiffeners 17 and 18.

The frame 7 of FIG. 4 is formed by two superposable identical halves 7a and 7b. The sides 13a, 14a, 15a and 16a of the frame half 7a, as well as the stiffeners 17 fast with this frame half, are formed by sections of rectangular omega cross-section, the flat flanges of which are coplanar.

Similarly, the sides 13b, 14b, 15b and 16b of flame 7b as well as stiffeners 18 are formed by rectangular omegas whose flat flanges are coplanar. In the frame part 7b, the sides 15b, 16b and the stiffeners 18 determine compartments 19 in which are disposed, as shown in FIG. 3, auxiliary stiffeners 20 parallel to sides 13b and 14b. These auxiliary stiffeners 20 are also in the form of rectangular omega sections fixed by their ends to the flat flanges of two adjacent intermediate stiffeners 18 or of a stiffener 18 and the corresponding side 15b or 16b. The cavities of the auxiliary stiffeners 20 are directed in the same direction as the cavities of sides 13b, 14b, 15b and 16b and the intermediate stiffeners 18.

On the flat flanges of the auxiliary stiffeners 20, are fixed, at the moment of assembly of these auxiliary stiffeners 20 in the corresponding compartments 19, portions of flexible support 8 corresponding to the dimensions of said compartments. The portions of flexible support 8 may be adhered to the auxiliary stiffeners 20, at least in their major part, whilst the edges of said skin portions are gripped between the flanges of the corresponding omega sections.

The two frame parts 7a and 7b are then assembled together so that the sectioned elements which correspond to one another form in two's a hollow element of rectangular or square section. When the parts 7a and 7b are assembled, a reinforcement 21, composed of a honeycomb structure, may be provided, which is housed inside the corresponding sides 13a,13b, 14a,14b, 15a,15b and 16a,16b of the two frame parts 7a and 7b. These two frame parts 7a and 7b may each be formed by a shell in one piece and the two shells are assembled by adhesion. The honey-comb structure 21 stabilises the walls of the frame and improves the rigidity thereof. The angle fittings 10 are secured in the two shells when the frame is assembled.

As shown in FIG. 5, the stiffeners 20 comprise shims 22 at their ends.

In this embodiment, the transverse sections which correspond to one another from one shell to the other, i.e. sections 17,18,15a 15b and 16a,16b are firstly assembled by their flanges 23, after which the auxiliary stiffeners 20 are fixed for example by lacing, riveting or any other means on said flanges 23 of said sections. In this way, the periphery of the support 8 is gripped between these flanges 23 and the ends, provided with shims 22, of the auxiliary stiffeners 20.

In the embodiment described with reference to FIGS. 3,4 and 5, the support 8 was divided into as many parts as there were compartments 19. FIGS. 6,7 and 8 illustrate an embodiment in which the support 8 may be in one piece. As shown in FIG. 6, this variant embodiment comprises, as before, two parts 7a and 7b to be assembled together. However, in this embodiment, shims 24 are provided which completely fill the cavity of each omega section forming the uprights of the frame parts 7a and 7b, as well as shims 25 completely filling the intermediate stiffeners 17 and 18. Thus, when the two parts 7a and 7b of the frame are assembled, said parts may imprison the one-piece support 8 therebetween. Solar cells 9 are then adhered in the spaces delimited between the intermediate stiffeners 17 and between said stiffeners and the sides 15a and 16a.

As shown in FIG. 8, the ends of the auxiliary stiffeners 20 are fixed by adhesion on the lower face of the flexible support 8 and by their end under the side flange 23 of the sections 8,15b or 16b.

In the variant embodiment shown in FIG. 9, the lower shell 7b of the frame 7 is such that the auxiliary stiffeners 20 are integral with the rest of said shell. Thus, in this embodiment, the lower part 7b of the frame is formed by one casting which comprises the sides 13b, 14b, 15b and 16b, the intermediate stiffeners 18 and also the auxiliary stiffeners 20. In this case, the flexible support 8 may either be in one part or in as many parts as there are compartments.

FIG. 10 illustrates how the shells 7a and 7b intended for forming a frame 7 can be obtained in one piece. These shells are obtained by moulding materials such as fabrics reinforced with carbon fibres or any other type of high characteristic fibres, impregnated with resin. This Figure shows that the fibres may be orientated in different combinations (intersecting and woven fibres, longitudinal fibres) to give the section, generally or locally, according to requirements, the desired characteristics of resistance and rigidity.

Of course, although in the embodiments described with reference to FIGS. 3 to 10 the possibility has been mentioned of obtaining frames 7 by associating two shells 7a and 7b, it is obvious that the frame could, according to the invention, also be constituted by an assembly of square tubes 26 and fittings 27 as shown schematically in FIG. 11.

The structure of panels for a solar generator according to the invention is therefore seen to eliminate the drawbacks of the known frames with support under tension or with support adhered to a trellis under tension. Due to the auxiliary stiffeners 20 carrying the flexible support, the design and dimensions of the flexible support (as far as both the network of solar cells with the interconnectors and the frequencies of the support in each compartment are concerned) may be distinguihed from those of the frame.

The invention therefore allows a simple adaptation to all types of satellites and launchers whatever the specific vibratory conditions. The frame obtained from two moulded shells assembled together is particularly adapted to the mode of supporting the network of cells 9 by the rectangular omega stiffeners and to the use of resins reinforced with fibres such as carbon, boron fibres . . . Furthermore, the structure of the frame according to the invention allows the sections to be reinforced by a honeycomb-structured core disposed between at least a part of the two shells, this enabling the resistance of the frame to be locally or generally improved.

The width 1 of an intermediate stiffener 20 is preferably substantially equal to the width $d$ of the solar cells 9. Each row of cells may then be arranged so as to rest on one stiffener 20 or astride two adjacent stiffeners 20, the cells being disposed in lines and in columns.

What we claim:

1. A solar generator capable of producing electrical energy from solar energy including at least one panel, said panel comprising:

an open frame having a pair of opposed sides and a pair of opposed ends;

a plurality of spaced, generally parallel intermediate stiffeners, each of which extends between and is connected to said sides;

a plurality of spaced, generally parallel auxiliary stiffeners transverse to and extending between adjacent intermediate stiffeners and between a stiffener and an adjacent one of said ends;

said frame and said intermediate stiffeners each comprising two mirror image sub-assemblies fastened together, each sub-assembly having a cross-section including a central cavity and a flange adjacent each edge thereof, said subassemblies being positioned with their flanges in contact;

a thin flexible sheet-like support disposed within said frame and at least partially fixed to said auxiliary stiffeners; and a plurality of solar cells carried on said flexible support.

2. A solar generator as claimed in claim 1, in which the solar cells are disposed in rows and columns on the flexible support, wherein the auxiliary stiffeners are of width substantially equal to that of a row of said cells.

3. A solar generator as claimed in claim 2, wherein the cells of each row rest flat, via the flexible support, on one auxiliary stiffener.

4. A solar generator as claimed in claim 2, wherein the cells of each row rest flat, via the flexible support, astride two adjacent stiffeners.

5. A solar generator as claimed in claim 1, wherein each auxiliary stiffener has a cross-section in the form of a rectangular omega and the flexible support is fixed on the opposite flanges of said sections.

6. A solar generator as claimed in claim 5, wherein the sides of the frame and the intermediate stiffeners comprise two rectangular omega sections whose cavities are opposite and which are assembled together by their side flanges.

7. A solar generator as claimed in claim 6, wherein the ends of the auxiliary stiffeners are fixed on said flanges of the sides of the frame or the intermediate stiffeners.

8. A solar generator as claimed in claim 6, wherein the frame is formed by two superposable shells, each in one piece and comprising sides, ends, and intermediate stiffeners having a rectangular omega cross-section.

9. A solar generator as claimed in claim 8, wherein said shells comprise a molded structure of resistant fibers coated with synthetic resin.

10. A solar generator as claimed in claim 9, wherein a reinforcement is provided inside the cavities of the sides and/or the intermediate stiffeners.

11. A solar generator as claimed in claim 8, wherein the auxiliary stiffeners are fixed on one of the shells.

12. A solar generator as claimed in claim 8, wherein the auxiliary stiffeners are integral with one of said shells.

13. A solar generator as claimed in claim 1, wherein the flexible support of the solar cells extends in one piece between said sides and between said ends.

14. A solar generator as claimed in claim 1, wherein the flexible support is composed of a plurality of elements, each of which covers a frame compartment, which compartment is defined by two adjacent intermediate stiffeners or by an end of the frame and an ajacent intermediate stiffener.

* * * * *